United States Patent [19]

Wuidart

[11] Patent Number: 5,764,653
[45] Date of Patent: Jun. 9, 1998

[54] METHOD AND APPARATUS FOR DETECTING ABNORMAL OPERATION IN A STORAGE CIRCUIT BY MONITORING AN ASSOCIATED REFERENCE CIRCUIT

[75] Inventor: Sylvie Wuidart, Le Cade, France

[73] Assignee: SGS-Thomson Microelectronics S.A., Saint Genis, France

[21] Appl. No.: 618,921

[22] Filed: Mar. 20, 1996

[30] Foreign Application Priority Data

Mar. 21, 1995 [FR] France ............... 95 03293

[51] Int. Cl.$^6$ ............................................. G11C 29/00
[52] U.S. Cl. .................................................. 371/21.1
[58] Field of Search .......................... 371/21.1, 21.2, 371/21.4, 67.1, 70, 71; 365/189.07, 190, 201, 202; 324/76.11, 151.1, 158 R

[56] References Cited

U.S. PATENT DOCUMENTS

| | | |
|---|---|---|
| 4,395,767 | 7/1983 | Van Brunt et al. ............... 371/25 |
| 4,747,043 | 5/1988 | Rodman ............................ 364/200 |
| 5,063,516 | 11/1991 | Jamoua et al. ................ 364/431.11 |
| 5,077,521 | 12/1991 | Langford, II et al. .......... 324/158 R |
| 5,440,234 | 8/1995 | Kondo .............................. 324/526 |
| 5,551,006 | 8/1996 | Kulkarni .......................... 395/473 |
| 5,572,720 | 11/1996 | Reed et al. ....................... 395/555 |

*Primary Examiner*—Hoa T. Nguyen
*Attorney, Agent, or Firm*—Wolf, Greenfield & Sacks, P.C.

[57] ABSTRACT

In an integrated circuit, a detector of information coherency is associated with a circuit for the storage of information. The detector includes a reference circuit that has the same structure as the storage circuit. The reference circuit contains complementary information under normal circumstances. A checking circuit of the detector verifies the complementary nature of the information in the reference circuit and detects disturbing phenomena that cause incoherence in the information contained in the storage circuit.

24 Claims, 2 Drawing Sheets

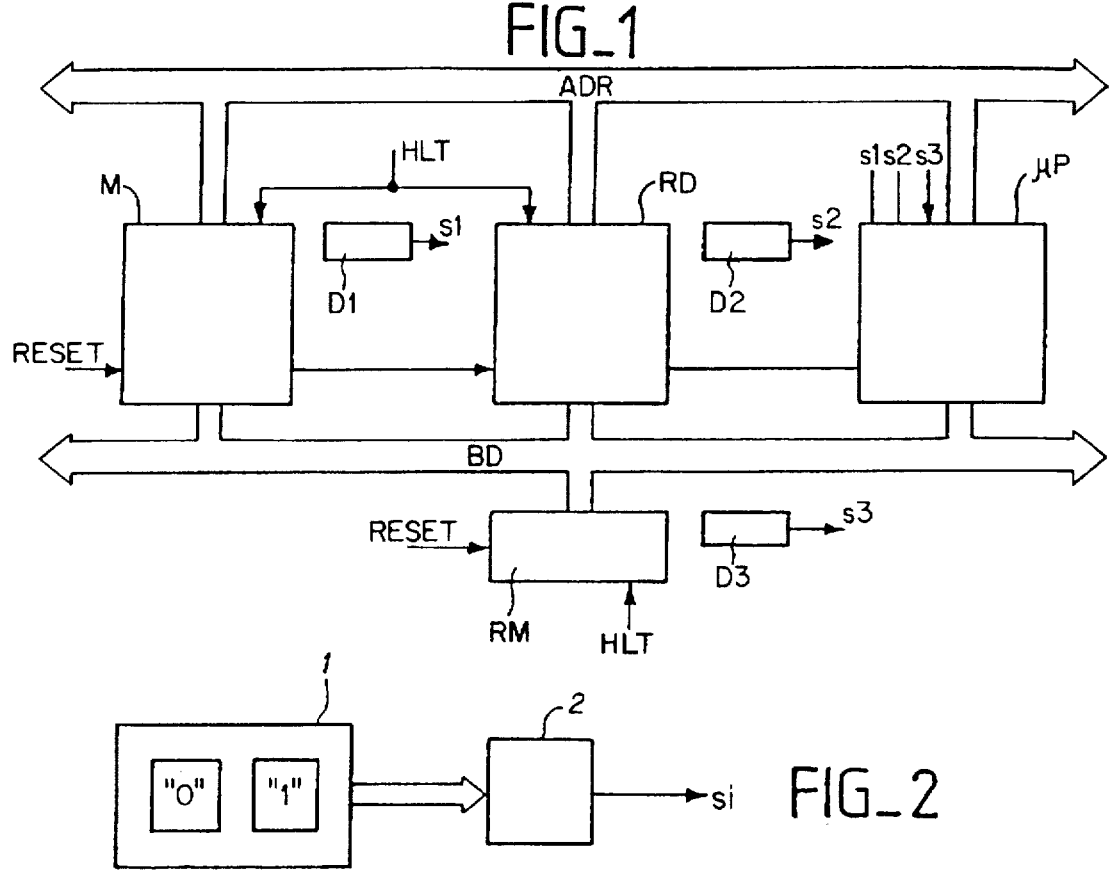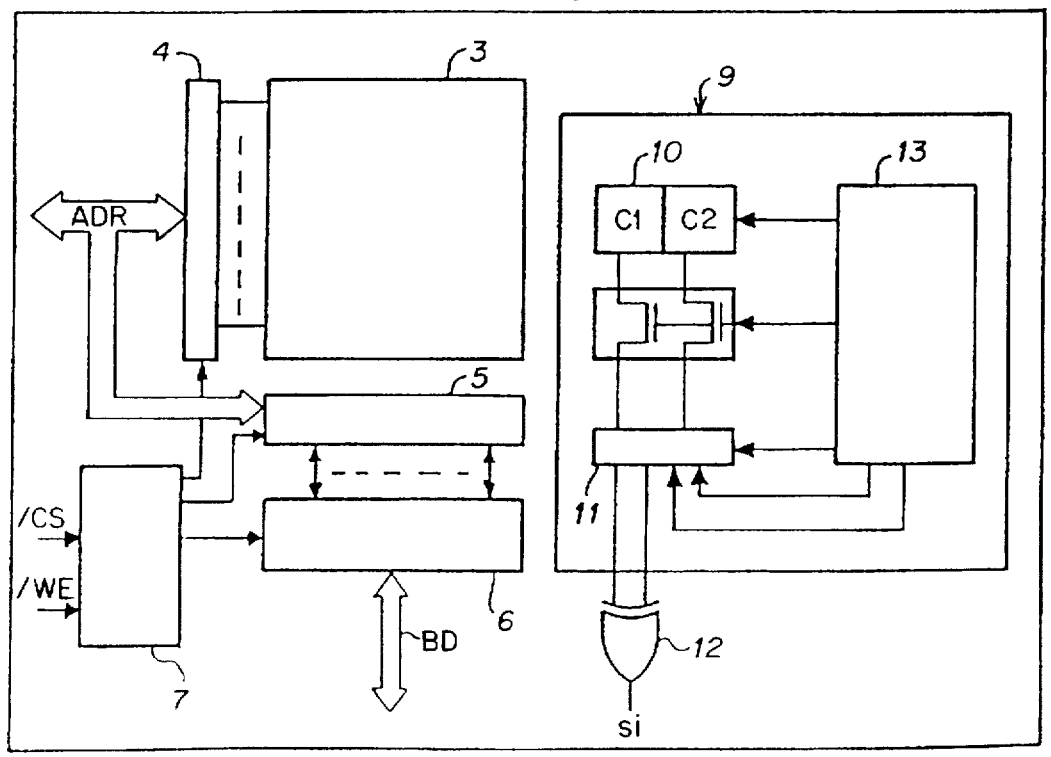

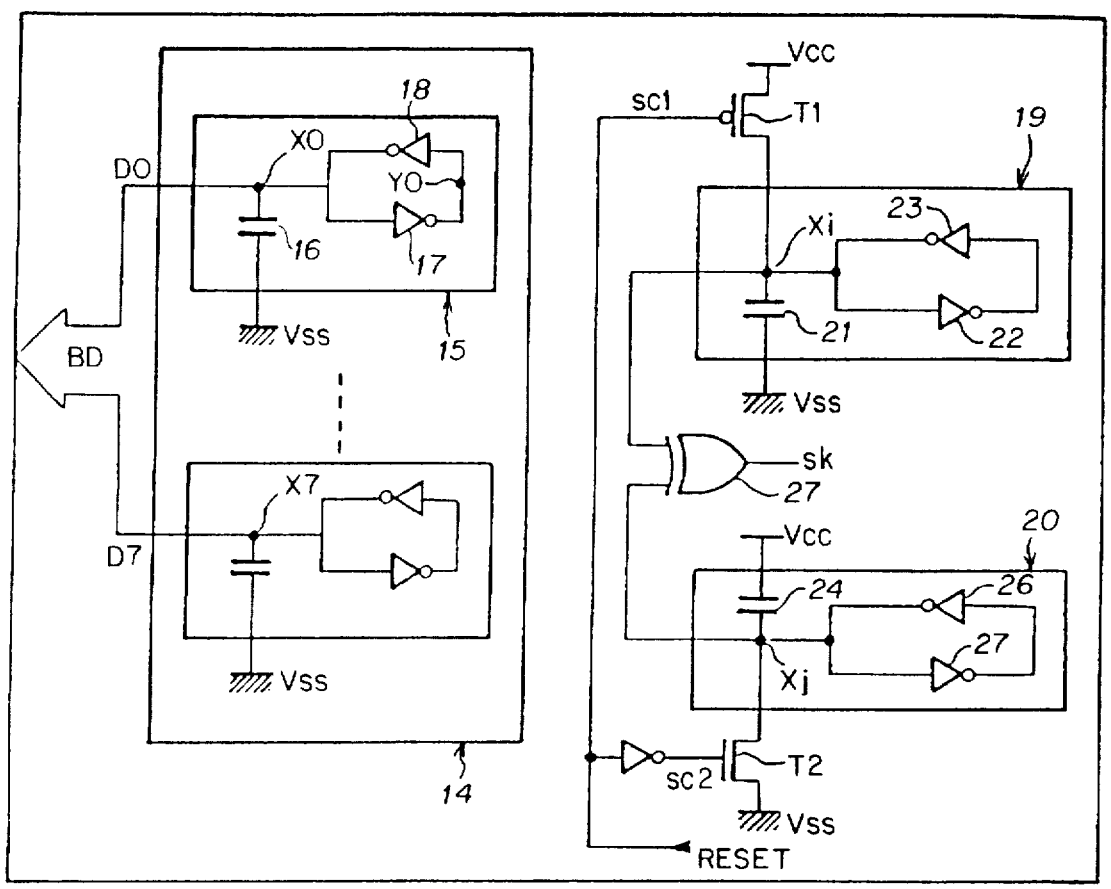
FIG_4
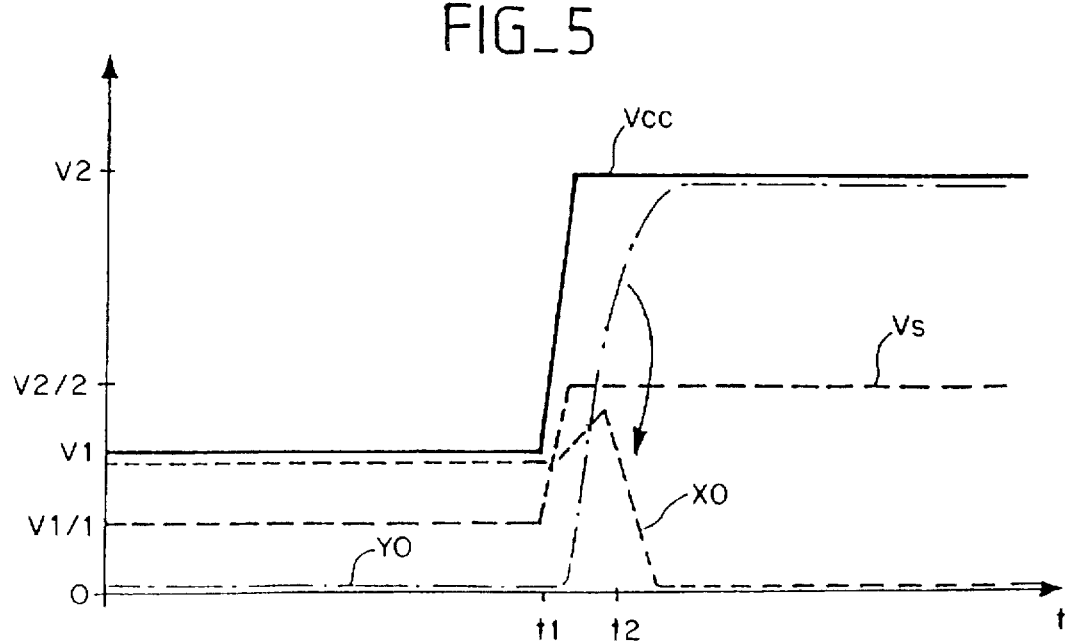
FIG_5

METHOD AND APPARATUS FOR DETECTING ABNORMAL OPERATION IN A STORAGE CIRCUIT BY MONITORING AN ASSOCIATED REFERENCE CIRCUIT

BACKGROUND OF THE INVENTION

1. Field of the Invention

The present invention relates to a detector of the coherence of information contained in storage circuits of a semiconductor integrated circuit, such as registers or memories. It can be applied especially to secured circuits, for example, circuits that are used to manage financial transactions.

2. Discussion of the Related Art

Detectors are often provided in integrated circuits in order to reveal abnormal conditions that are liable to cause deterioration in the circuit's operation. Thus, there are circuits to detect a low supply voltage and/or a high supply voltage of the circuit, and temperature detectors, and detectors that are used to forestall threats that are identified beforehand, etc. But, such detectors have the drawback of identifying only certain well-specified threats to the operation of the electronic circuit and ignore unidentified phenomena such as electromagnetic radiation, bombardment by X-rays, reversal of the electrical supply, etc. Hence, as long as the circuit is not subjected to a pre-identified disturbing phenomenon, it is presumed it is in operation, even though the information contained in the integrated circuit may have deteriorated due to modification by a phenomenon that is not one of the pre-identified threats.

SUMMARY OF THE INVENTION

It is an object of the present invention to overcome the aforementioned drawback by checking the integrity of the information contained in storage circuits of an integrated circuit liable to be subjected to various unidentified phenomena that could endanger its efficient operation.

According to the invention, through the association, with a storage circuit, of a reference circuit with the same structure that contains complementary information, and through the checking of this complementary nature, any disturbing phenomena causing incoherence in the information of the storage circuit is detected.

An embodiment of the present invention relates to a detector of the coherence of information contained in a storage circuit of an integrated circuit. The detector has a reference circuit with the same structure as the storage circuit containing complementary information, and a circuit to check the complementary nature of the information to detect any disturbing phenomenon that has caused incoherence in the information of the storage circuit.

In an embodiment of the present invention relating to a memory circuit, the reference circuit comprises a memory array of at least two cells, a circuit for writing in the cells to write the complementary information, and a read circuit to deliver the information read to the circuit that checks the complementary nature of this information. The different elements of the reference circuit are of the same type as those corresponding to the memory circuit.

In an embodiment of a storage circuit, one element of which includes a capacitor whose terminal is connected to a node for the looping of series-connected invertors, the reference circuit has at least two elements of this type, the complementary nature of the information contained in these elements of the reference circuit being obtained by placing a load transistor in series either between a first logic voltage and the terminal of the capacitor connected to the looping node, or else between a second logic voltage and the terminal of the capacitor connected to the looping node.

The invention also relates to an integrated circuit containing storage circuits. According to the invention, a detector of the coherence of information elements is associated with each of these storage circuits.

BRIEF DESCRIPTION OF THE DRAWINGS

Preferred, non-limiting embodiments of the present invention will be described by way of example with reference to the accompanying drawings, in which:

FIG. 1 shows a general architecture of an integrated circuit comprising information coherency detectors according to an embodiment of the present invention;

FIG. 2 is a diagram showing the principle of a detector of the coherence of information according to an embodiment of the present invention;

FIG. 3 is a diagram of an application of the detector of the coherence of information to a memory circuit;

FIG. 4 is a diagram of an application of a detector of the coherence of information to a capacitive holding register with looping of invertors; and FIG. 5 is a graph of the different signals of the register shown in FIG. 4.

DETAILED DESCRIPTION

FIG. 1 exemplifies a general architecture of an integrated electronic circuit comprising a microprocessor µP, a shift register RD, a memory M, a hold register RM for the holding of data, a data bus BD connected to the different elements of the circuit, and an address bus ADR also connected to the different elements of the circuit. The integrated electronic circuit also has circuits for the detection of the coherence of the information elements contained in the different storage circuits of the integrated circuit.

In the example, there is thus a first detector D1 of the coherence of the information contained in the memory M, a second detector D2 of the coherence of the information contained in the shift register RD and a third detector D3 of the coherence of the information contained in the holding register RM. These detectors of the coherence of information each respectively deliver an output signal s1, s2, s3 providing information on the coherence of the information elements contained in the corresponding storage circuit. These signals are applied to a circuit for the management of anomalies that may be the microprocessor in the example shown and that delivers, for example, a locking signal HLT to the different elements of the electronic circuit.

Each coherence detector has a reference circuit and a control circuit, respectively referenced 1 and 2 in the schematic diagram of FIG. 2. The reference circuit has the same structure as the corresponding storage circuits and contains complementary information elements referenced "0" and "1" in the FIG. It delivers the information elements to the control circuit which checks their complementary nature and delivers an output signal (si) whose logic state provides information on the coherence of the information elements contained in the storage circuit. Preferably, the reference circuit has two storage elements of the same type as those of the storage circuit one containing the information "0", the other containing the complementary information "1".

An application of the invention to a memory is shown in FIG. 3. A memory circuit generally includes: an array 3 of memory cells that store the information elements, the array taking the form of a matrix of n rows and p columns, a row decoder 4 that enables the selection of one row from among n rows which is controlled by the address bus ADR, a column decoder 5 that enables the selection of one or more columns from among p columns, which is also controlled by the address bus ADR, and write and read circuits 6, placed at the end of each column, that convey the data elements to be written to the memory cells or, conversely, transmit the data elements that have been read to the output. The write and read circuits are complicated in varying degrees depending on the nature of the memory cell or the speed of the memory cell.

For static RAM cells for example, based on bistable circuits, they consist simply of access switches to set a new state of the bistable circuit or to read the memorized state. For programmable read-only memory cells, they include precharging circuits, amplifiers and comparators to make the quantity of charge stored in a cell correspond to an electrical variable (such as current or voltage) which is then compared with a threshold to give the corresponding logic information. It should be noted that the term "information" is understood to mean a binary data element 0 or 1 corresponding to a low or high logic state. For dynamic memory cells, these would also include data refreshing circuits.

In addition to these internal circuit elements, the memory circuit has a control logic 7 that manages the exchanges of the memory with the exterior. In one example of an asynchronous memory, this control logic receives circuit collection control signals /CS and write enable signals /WE and, in response, appropriately activates the read/write circuit 6 or places the entire memory in a standby position when it is not selected, thus enabling power consumption to be reduced to a minimum.

A reference circuit 9 of a detector of coherence of the information contained in such a memory circuit will then preferably include a memory array 10 of reference cells (C1, C2) containing complementary information and corresponding write/read circuits 11. The write circuit enables the writing of the complementary information in the reference cells. Depending on the type of memory, this writing can be done only once, preferably during manufacture in the case of non-volatile memories, or whenever the integrated circuit is powered, in an initializing stage, for volatile memories.

The read circuits enable the control circuit 12 to be provided with the information read in the reference cells so that it can check their complementary nature. These elements of the reference circuit are of the same type as those of the corresponding memory circuit. The reference circuit furthermore comprises a control logic 13 to select the reference cells in write or read mode according to a sequence that is identical (in terms of access speed and timing diagram) to that of the memory circuit but enables one continuous access in reading mode or repeated access in reading mode to check the complementary nature of the information elements throughout the operation of the circuit. The frequency of the repetition of access may be random or fixed and may depend on the read access time. Row or column decoders specific to the reference circuit are no longer necessary unless controls by pairs of cells are to be envisaged. In this case, the reference circuit comprises several pairs of cells containing complementary information. In the simple case of two reference cells placed on one and the same row and on two columns, the control logic 13 directly manages the bit line and there is provision for a gate circuit controlled by the control logic to connect the columns to the read/write circuit 11.

In a preferred example of a reference circuit, the control circuit has two storage elements C1, C2, one Exclusive-NOR gate 12 that delivers a "1" at output if the information elements are identical or a "0" if they are complementary. The complementary information elements contained in the reference circuit which, according to the invention, have the same elements as the memory circuit, are likely to be modified in the same way as those contained in the memory circuit. Indeed, the information read is a function of the information actually written in a cell of the memory and, as the case may be, a function of the characteristics of the read circuits: abnormal conditions of operation may indeed affect the result of the reading, for example by modifying the switch-over thresholds of the invertors. By using a reference circuit in which the entire sequence of access to the information (writing, storage, reading) is duplicated, it becomes possible to detect any disturbance that could affect the memory circuit in one way or another.

In an application to a capacitive holding register 14 shown in FIG. 4, an element 15 of the register includes a capacitor 16, a terminal of which is connected to the node X0 of a stage of series-connected, looped invertors. The capacitor is furthermore connected to a logic voltage (Vss). In the example, the looping stage comprises two invertors 17 and 18, one of which (17) has very low resistivity in order to follow the variations of the looping node X0, the other (18) being highly resistive to hold the information on the node X0 at output. Such a register is conventionally used to hold data elements in the buses of the integrated circuit. In the example, the data bus comprises eight bits D0–D7, the register 14 has eight storage elements similar to element 15 already described, the node of each looping stage being connected to a capacitor that is connected to a respective bit of the data bus (X0 connected to D0, . . . , X7 connected to D7).

According to the invention, a detector of coherence of information is associated with the capacitive holding register. This detector has a reference circuit comprising, in the example shown, two storage elements 19 and 20 of the same type as the elements (15) of the holding register 14. The storage element 19 thus has a capacitor 21, one terminal of which is connected to the node Xi of a stage for the looping of series-connected invertors 22, 23. The storage element 20 has a capacitor 24, one terminal of which is connected to the node Xj of a stage for the looping of series-connected invertors 25, 26.

According to the invention, the storage elements of the reference circuit contain complementary information elements. The reference circuit advantageously has a device to set one of the storage elements at 1 and the other at 0. Thus, for the first storage element 19, a load transistor T1 is provided between a first logic voltage (Vcc) and the terminal of the capacitor 21 connected to the looping node Xi, the other terminal of the capacitor 21 is connected to a second logic voltage (Vss). For the second storage element 20, a load transistor T2 is provided between the second logic voltage (Vss) and the terminal of the capacitor 24 connected to the looping node Xj. A control signal, respectively sc1 and sc2, makes the transistors T1 and T2 conductive to respectively obtain, after the circuit is turned on, a voltage of the order of the first logic voltage at the node Xi and of the second logic voltage at the node Xj.

In the case of a first logic voltage equal to the positive logic supply voltage of the circuit (Vcc) and a second logic voltage equal to the zero logic supply voltage (Vss), there is thus obtained a logic state "1" at the node Xi and a logic state "0" at the node Xj, held by their respective stage of series-connected looped invertors: the storage elements herein give a direct reading of the stored information. The inputs of the control circuit are therefore connected to the looping nodes Xi, Xj of the storage elements. The control circuit, in this example, has an exclusive NOR gate 27 that delivers the detection signal as output.

Hereinafter, it shall be assumed that the first logic voltage is Vcc and that the second logic voltage is Vss. Preferably, the transistor T1 will then be a P type transistor (MOS channel P or bipolar PNP for example), controlled by the reset signal of the elements of the integrated circuit, and the transistor T2 will be an N type transistor (MOS channel N or bipolar NPN for example), and activated by the reverse of the reset signal of the integrated circuit. Thus, during the resetting phase, during which the reset signal of the integrated circuit is in the low state, the transistors T1 and T2 are made conductive.

The detector according to the invention enables the detection of any disturbing phenomenon which, in the particular case of storage by capacitive holding and looping of invertors, may affect, in particular, the load of the capacitor and the switchover thresholds of the invertors.

FIG. 5 thus shows a timing diagram of the signals of the storage elements 15 of the hold register 14 of FIG. 4. The node X0 is at "1" in the example, namely at a level close to that of the logic voltage Vcc which has a nominal voltage V1. The threshold Vs of the invertors is a function of the voltage at the terminals (here Vcc−Vss=Vcc) and is calibrated in a standard way to be equal to half of this voltage, namely in this case Vcc/2=V1/2. The node Y0 between the first and second invertor is at the logic state "0", namely at 0 volts.

If a disturbance prompts a sudden increase in Vcc, which takes a value V2, the threshold of the invertors will follow and become greater so as to be equal to V2/2. The node X0, held initially at the same level by the second highly resistive invertor, then has a voltage lower than the threshold of the first invertor which has low resistivity, which will then switch over very swiftly and impose a state "1" on the node Y0: the node Y0 goes from 0 to V2. The second highly resistive invertor will take account of this variation at the end of a certain period of time and will itself switch over at t2 to impose a logic state "0" on X0. The system is then in a new state of equilibrium. If a sudden variation causes a fall in the voltage Vcc, the level "1" of the node X0 is still sustained. However, a level "0" would be modified to become a level "1".

The detector according to the invention, by verifying the complementary nature of the information elements at Xi and Xj, will enable the presence of a disturbing phenomenon to be detected.

More generally, according to the invention, any phenomenon liable to disturb a storage circuit is detected through checks on the complementary nature of the information elements of the reference circuit. Because, a disturbance typically acts only in one direction, by shifting a point of equilibrium (in the case of bistable circuits, invertors) or by modifying a quantity of charge (in the case of capacitors or read-only memory cells), it can therefore prompt only one type of binary transition, either from 0 to 1, or from 1 to 0. The other binary state is typically sustained in its prior state. Thus, by associating, in an integrated circuit, a detector at each storage circuit with a reference circuit having the same structure as its corresponding storage circuit, it is possible to provide for an integrated operation of the circuit.

Preferably, the reference circuit will be made topologically beside the corresponding storage circuit, with the same masks so that the disturbing phenomenon, if any, reaches it in the same way or with the same intensity. In a simple and advantageous way, it has two storage elements as shown in FIGS. 3 and 4. It could have many of them, for example two elements containing a "1" and two elements containing a "0". The control circuit could then first of all ascertain that there actually are both "1s" and both "0s" by means of NAND gates and exclusive NOR gates.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A detector for detecting coherence of information elements in a storage circuit, each information element of said information elements including a capacitor having a first terminal connected to a logic voltage and a second terminal connected to a node of corresponding series-connected looped invertors, said detector comprising:

a reference circuit including at least two of said information elements for storing complementary information;

a first load transistor connected in series between a first logic voltage and a second terminal of a capacitor of a first one of said at least two information elements, a first terminal of the capacitor of the first one of said at least two information elements being connected to a second logic voltage;

a second load transistor connected in series between the second logic voltage and a second terminal of the capacitor of a second one of said at least two information elements, a first terminal of the capacitor of the second one of said at least two information elements being connected to the first logic voltage; and a circuit for checking the complementary information stored in said at least two of said information elements of the reference circuit to detect any disturbing phenomenon that has caused incoherence in the information elements of said storage circuit.

2. A detector according to claim 1, wherein conduction of the first and second load transistors is controlled by a signal for resetting the storage circuit.

3. A detector according to one of the foregoing claims, wherein the circuit for checking includes an Exclusive-NOR logic gate receiving, at respective inputs, respective read outputs of said at least two of said information elements of said reference circuit and delivering a binary detection signal, the logic state of which provides information on the coherence of the information elements of said storage circuit.

4. A detector according to claim 3, wherein the binary detection signal is applied to a circuit for management of anomalies so as to stop the operation of said storage circuit.

5. A detector according to claim 1, wherein said storage circuit and said reference circuit are topologically located beside each other and manufactured using a single mask.

6. A detector according to claim 1, wherein said detector and said storage circuit are formed in an integrated circuit, and wherein said integrated circuit includes a respective detector that is associated with each storage circuit formed in said integrated circuit.

7. An information coherency detector for detecting information coherency in an information storage circuit, the information coherency detector comprising:

a reference circuit to store complementary information, the reference circuit being located adjacent to the information storage circuit and having a structure that is substantially similar to the information storage circuit; and a detection circuit, coupled to the reference circuit, to detect information incoherency in the reference circuit.

8. The information coherency detector of claim 7, wherein the detection circuit includes a comparison circuit, the comparison circuit receiving information from the reference circuit and producing a detection signal that indicates whether the information is complimentary.

9. The information coherency detector of claim 8, wherein the information storage circuit is a memory circuit, and the reference circuit includes:

first and second memory cells; and a read circuit coupled to the first and second memory cells to read information from the first and second memory cells and provide that information to the comparison circuit.

10. The information coherency detector of claim 9, wherein the reference circuit further includes a write circuit, coupled to the first and second memory cells, to write complimentary information into the first and second memory cells.

11. The information coherency detector of claim 7, wherein the reference circuit is located sufficiently proximate to the information storage circuit so that disturbances affecting information coherency in the information storage circuit also affect information coherency in the reference circuit.

12. The information coherency detector of claim 7, wherein the reference circuit includes:

a first reference storage element having a capacitor and first and second series-connected invertors, the capacitor having a first terminal that is coupled to a first logic voltage terminal, and having a second terminal that is connected between the first and second series-connected invertors, the second terminal of the capacitor also being connected to a first switch that is coupled in series to a second logic voltage terminal; and a second reference storage element having a capacitor and first and second series-connected invertors, the capacitor having a first terminal that is coupled to the second logic voltage terminal, and having a second terminal that is connected between the first and second series-connected invertors, the second terminal of the capacitor also being connected to a second switch that is coupled in series to the first logic voltage terminal.

13. The information coherency detector of claim 12, wherein the first switch and the second switch each have a respective control terminal that is responsive to a reset signal, and an assertion of the reset signal causes the second terminal of both capacitors to assume complimentary values.

14. The information coherency detector of claim 12, wherein the detection circuit includes a comparison circuit having first and second terminals that receive the information from the reference circuit, the first and second terminals being electrically coupled to a respective one of the second terminals of the capacitors of the first and second reference storage elements.

15. An information coherency detector comprising:

means for storing complimentary information, the means for storing being substantially structurally similar to an information storage circuit; and means, coupled to the means for storing, for detecting information incoherency in the information storage circuit by detecting information incoherency in the means for storing.

16. The information coherency detector of claim 15, wherein the means for storing is sufficiently proximate to the information storage circuit so that disturbances affecting information coherency in the storage circuit also affect information coherency in the means for storing.

17. The information coherency detector of claim 15, wherein the means for detecting includes a means for comparing a complimentary nature of information received from the means for storing, the means for comparing producing a detection signal indicating whether the information received from the means for storing is complimentary.

18. The information coherency detector of claim 15, wherein the storage circuit is a memory circuit, and the means for storing includes:

first and second memory cells for storing bits of information; and a read circuit, coupled to the first and second memory cells, for reading the complimentary bits of information from the first and second memory cells.

19. The information coherency detector of claim 18, wherein the means for storing further includes a write circuit, coupled to the first and second memory cells, for writing complimentary bits of information into the first and second memory cells.

20. The information coherency detector of claim 18, wherein the means for detecting includes a means for comparing a complimentary nature of information received from the means for storing, the means for comparing receiving a first bit of information from the first memory cell, receiving a second bit of information from the second memory cell, and producing a detection signal indicating whether the first bit of information is complimentary to the second bit of information.

21. A method for detecting information incoherency in a storage circuit comprising the steps of:

storing complementary information in a reference storage circuit;

reading the complementary information stored in the reference storage circuit; and determining whether the complementary information is complimentary to detect information incoherency in the storage circuit.

22. The method of claim 21, wherein the reference storage circuit is substantially structurally similar to the storage circuit so that disturbances affecting information coherency in the storage circuit also affect information coherency in the reference storage circuit.

23. The method of claim 21, wherein the steps of reading and determining occur periodically at predetermined time intervals.

24. The method of claim 21, wherein the step of storing complementary information in the reference storage circuit includes:

storing a plurality of bits of information having a first polarity; and storing a plurality of bits of information having a polarity that is complementary to the first polarity.

* * * * *

UNITED STATES PATENT AND TRADEMARK OFFICE
CERTIFICATE OF CORRECTION

PATENT NO. : 5,764,653
DATED : June 9, 1998
INVENTOR(S) : Sylvie Wuidart

It is certified that error appears in the above-identified patent and that said Letters Patent is hereby corrected as shown below:

```
On the title page, Item [75] should read:

Inventor:            Sylvie Wuidart, Pourieres, France
```

Signed and Sealed this

Fifteenth Day of September, 1998

Attest:

BRUCE LEHMAN

*Attesting Officer*       *Commissioner of Patents and Trademarks*